United States Patent [19]

Hautaniemi et al.

[11] 3,722,263
[45] Mar. 27, 1973

[54] ULTRASONIC INSPECTION APPARATUS

[75] Inventors: Bruno Wendell Hautaniemi, Ithaca; Robert A. Bowman, Ludlowville; Kenneth R. Bangerter, Ithaca, all of N.Y.

[73] Assignee: Ithaco, Inc., Ithaca, N.Y.

[22] Filed: Dec. 21, 1970

[21] Appl. No.: 99,785

[52] U.S. Cl. ................................. 73/67.8 S, 73/71.5
[51] Int. Cl. ............................................. G01n 29/04
[58] Field of Search..........73/67.8, 67.8 S, 67.9, 71.5

[56] References Cited

UNITED STATES PATENTS

| | | | |
|---|---|---|---|
| 3,247,709 | 4/1966 | Gordon | 73/67.8 |
| 3,555,888 | 1/1971 | Brown | 73/71.5 |
| 3,496,764 | 2/1970 | Stouffer | 73/67.8 |
| 3,420,097 | 1/1969 | Batterman et al. | 73/71.5 |
| 3,534,591 | 10/1970 | Phelan | 73/71.5 X |
| 3,225,136 | 12/1965 | Furon | 178/6.6 |
| 3,269,173 | 8/1966 | Von Ardenne | 73/67.9 |
| 3,474,664 | 10/1969 | Mitchell et al. | 73/67.9 |

FOREIGN PATENTS OR APPLICATIONS 776,370   6/1957   Great Britain........................73/67.8 S

*Primary Examiner*—Richard C. Queisser
*Assistant Examiner*—Arthur E. Korkosz
*Attorney*—Richard G. Stephens

[57] ABSTRACT

Ultrasonic inspection apparatus includes an improved transducer guide assembly to provide uniform acoustic coupling to an animal. Successive line scan traces made in a fixed position on the face of a cathode ray tube as a transducer moves along a complex path and as reflected sound energy is received are imaged on successive portions of a film which need not be translated relative to the cathode ray tube. A plurality of cams translate a lens mounted in between the cathode ray tube and the film and appropriately rotate the film without translating it. In one alternative embodiment the cathode ray tube image is both translated and rotated electronically, so that no relative motion is required between the cathode ray tube and the film. In several other embodiments, the CRT line trace is relayed using fiber optics or photosensors and light-emitting diodes to provide a remote trace along a rigid rod which is appropriately moved relative to the film.

25 Claims, 27 Drawing Figures

B.W. HAUTANIEMI
R.A. BOWMAN
K.R. BANGERTER
   INVENTORS.

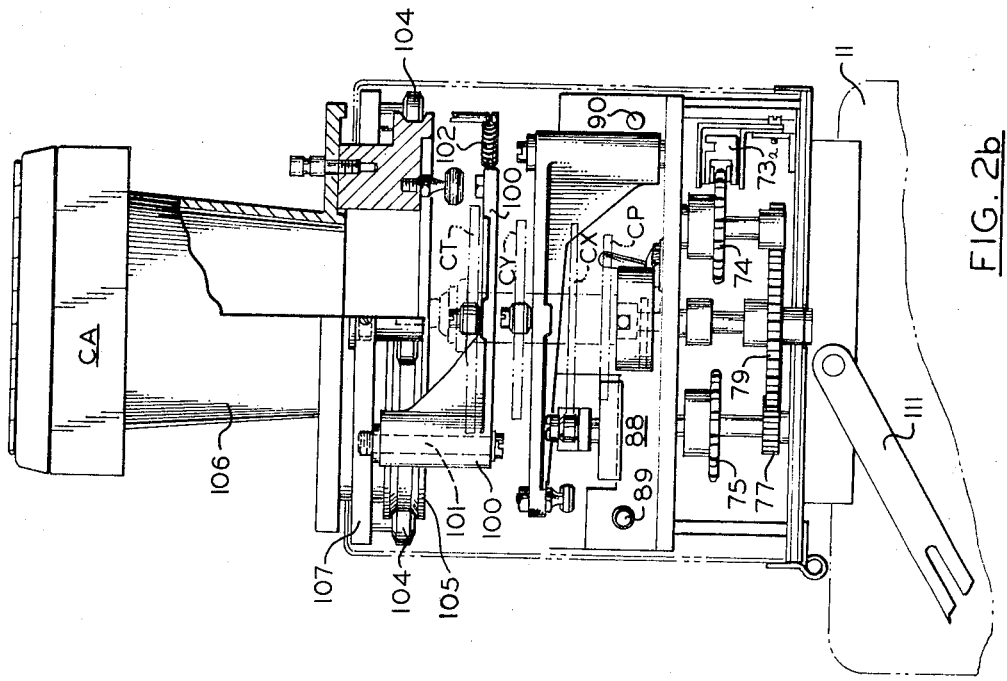
FIG. 2b
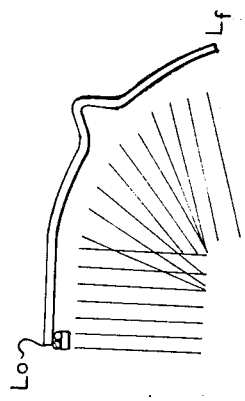
FIG. 3b
$$\frac{dx}{dL} = k_1 \cos\theta \quad \frac{dy}{dL} = -k_1 \sin\theta$$
$$\frac{d\theta}{dL} = k_2$$
FIG. 3c
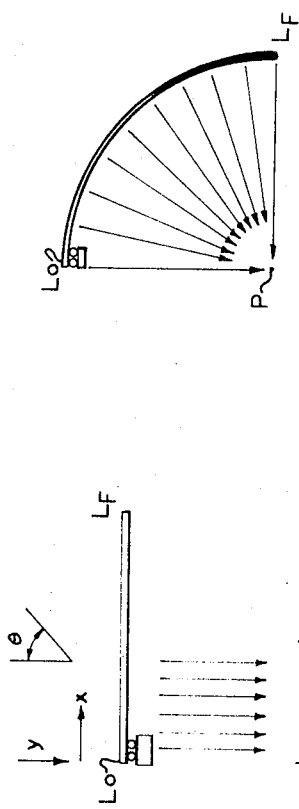
FIG. 3a
$$\frac{dx}{dL} = k_1 \quad \frac{dy}{dL} = 0$$
$$\frac{d\theta}{dL} = 0$$

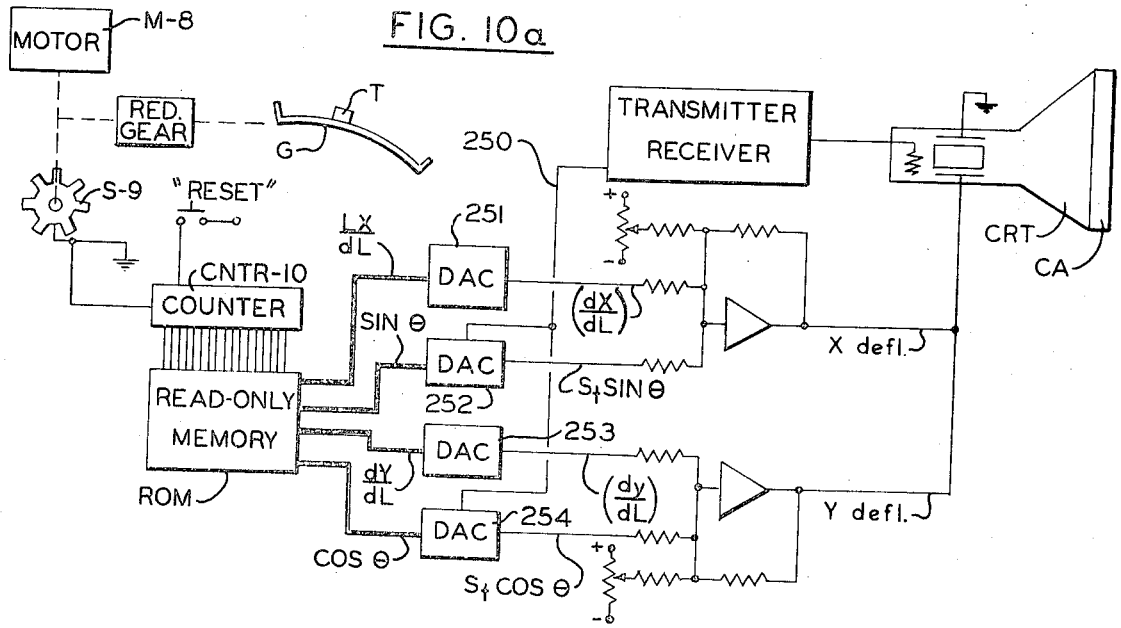
FIG. 10a
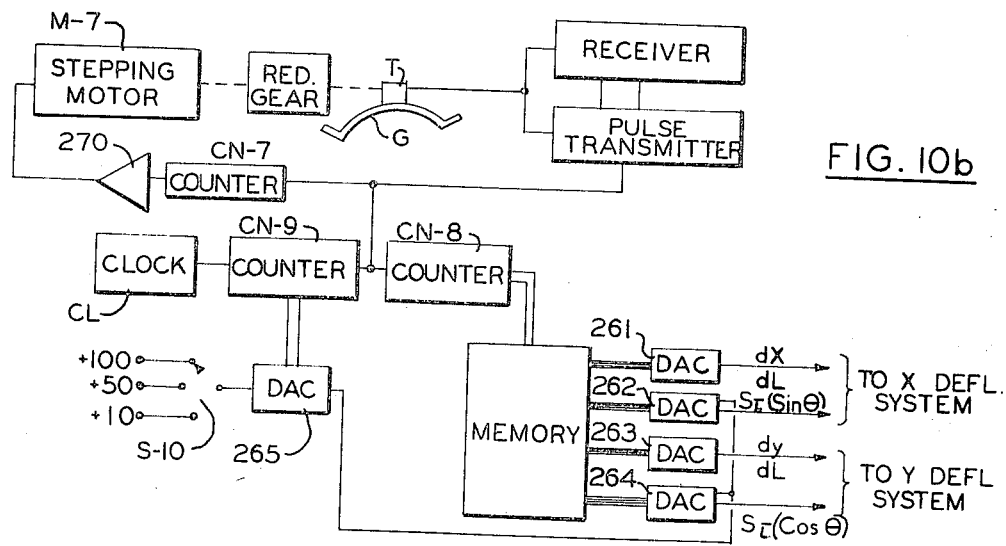
FIG. 10b
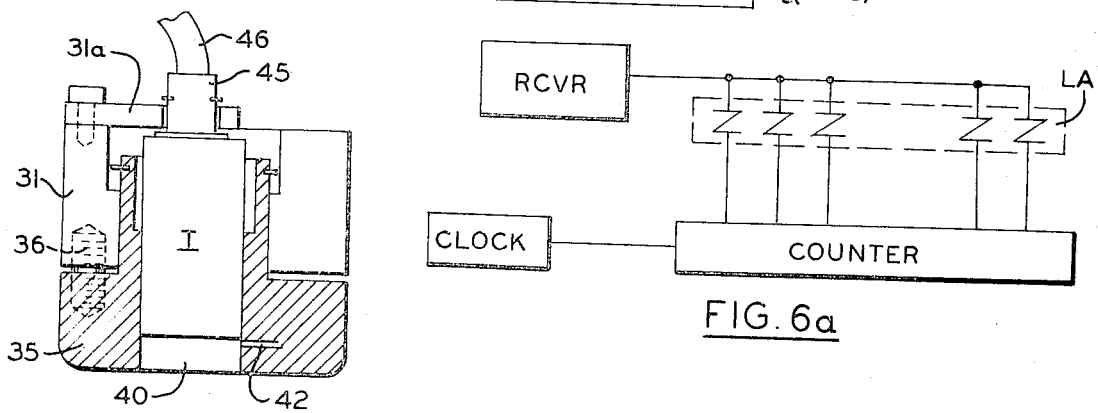
FIG. 11
FIG. 6a

ULTRASONIC INSPECTION APPARATUS

This invention relates to ultrasonic inspection apparatus, and more particularly, to improved apparatus for obtaining pictures which illustrate cross-sections of portions of live animals, ordinarily hogs or cattle, although it will become apparent that certain features of the invention are readily applicable to similar apparatus used to inspect portions of humans, fish, and non-animal devices. U.S. Pat. No. 3,496,764 illustrates a system wherein a piezo-electric ultrasonic transducer is driven along a curved guide which is pressed against the back of an animal, so that ultrasonic energy pulses are applied to the animal and reflected ultrasonic energy is received from the animal. The reflected energy intensity-modulates a cathode ray tube beam which is swept along a line on the face of the cathode ray tube, providing a succession of modulated scan lines, all of which appear in the same location in the face of the cathode ray tube. A camera carrying a film in a plane parallel to the face of the cathode ray tube is moved in synchronism with the motion of the transducer, so that successive scan lines appearing in the CRT face are imaged on successive locations on the film thereby providing a picture which corresponds fairly accurately to a cross-section view through the portion of the animal over which the transducer travels.

Because the outer contours of the animal areas of principal interest are frequently not straight nor perfectly circular, it is necessary for many applications that the transducer guide move the ultrasonic transducer along a non-linear path described by an empirical function or curve, and in order that the pictures be produced be readily interpretable without great skill, it is necessary that successive CRT scan lines be imaged on the film with a relative movement which accurately corresponds to the shape of the non-linear transducer path established by the transducer guide. U.S. Pat. No. 3,496,764 illustrates a system employing a plate having a plurality of curved slots which translate and rotate the camera film relative to the face of the CRT as the transducer moves along the transducer guide. While such an arrangement is much preferable to various hand-held prior systems wherein no transducer guide was used, it has several disadvantages which are overcome by the present invention. The disadvantages include an inability to provide proper camera motion for certain shapes of transducer guides. If successive points along a transducer path are specified by two rectangular coordinates, it can be shown that the amount of camera displacement which can be provided in one coordinate direction is inherently limited by the amount which is provided in the other coordinate direction, since a pin situated in a slot in the plate can only work against the sides of the slot. Similarly, the curves of transducer guides which have small-radius portions cannot be easily accommodated. Furthermore, it is highly desirable that a given CRT-receiver-camera unit be usable with a considerable variety of differently curved transducer guides, and that any changes necessary to vary the required CRT to camera film relationship as different guides are substituted be readily and easily made by an unskilled operator, without any tedious or precise adjustments, as such changes frequently must be made in a stockyard or cattle pen. The mentioned prior art system does not allow such changes to be made readily, but rather requires a substantial dismantling of the unit to substitute a different plate with different slots. Furthermore, it is difficult to seal the prior system from light and dust leakage. Principal objects of the present invention are to overcome each of the above-mentioned disadvantages of the prior system of U.S. Pat. No. 3,496,764.

In typical applications, a voltage pulse applied to the piezo-electric transducer causes it to oscillate so as to provide ultrasonic energy, at a 2 megacycle frequency, for example, with successive bursts provided at perhaps a one kilocycle repetition rate, and the transducer is moved along the guide, typically a distance of perhaps 8 inches, from one end of the guide to the other end in approximately ten seconds. It is necessary, in order that the reflected ultrasonic energy accurately represent the interior of the animal, not only that the acoustic coupling between the animal mass and the transducer be sufficient, but moreover that the coupling tend to be uniform, with minimum change as the transducer rubs across the animal. Because of animal hair and variations from animal to animal, the shape of a given transducer guide cannot conform accurately to the contour of many animals. While the prior art (e.g. U.S. Pat. No. 3,496,764) has suggested the use of a fluid-filled rubber bulb on the end of the transducer, so that compression and expansion of the bulb tends to keep the transducer coupled to the animal, such an arrangement has not been wholly satisfactory, perhaps in part because it resulted in the interposition of a fluid path of varying length or height and width between the transducer and the animal.

In accordance with one feature of the present invention, the transducer is coupled to the animal by means of a liquid cavity into which the transducer extends, with the cavity having an opening which is pressed directly against the animal, so that fluid within the cavity bears directly against the animal. By this means, the length and volume of the fluid path interposed between the transducer and the animal are maintained essentially constant as the transducer moves across the animal. The fluid, which may be oil or water, is supplied to the cavity under pressure as the cavity and transducer are moved across the animal, leaving a trace of fluid on the animal, but with lost fluid being continuously replenished in the cavity with a predetermined pressure. Furthermore, a passage in the transducer conveyor block immediately ahead of the transducer cavity also expels fluid onto the animal to pre-wet a path in advance of the transducer cavity, so that the transducer cavity continuously passes over animal areas which have been pre-wetted. Such pre-wetting results in uniform acoustic coupling between the transducer and the animal during the pass of the transducer across the animal, thereby providing improved pictures of greater fidelity and accuracy. Thus it is another object of the present invention to provide improved ultrasonic animal inspection apparatus incorporating improved transducer to animal acoustic coupling.

While one embodiment of the invention utilizes a positioning mechanism to image successive scan lines on the film by mechanically translating a lens relative to the CRT and the film camera, and by rotating the film carrier relative to the CRT, one further embodiment to be disclosed requires no mechanical movement of a lens nor any relative movement between the CRT and the film carrier, and it is a further object of the invention to provide an improved ultrasonic scan recording system having those advantages.

As mentioned above, it is desirable that a variety of differently-shaped transducer guides be usable with a scanner in order to examine a variety of different animal contours, and it is desirable that the system be readily convertible from one contour to another. In one embodiment of the invention, a transducer guide is formed as a plurality of successive sections hinged together, so that a given guide may be used with a large variety of different animal contours, and the provision of a system which utilizes such a multi-section guide is a further object of the invention.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 2:
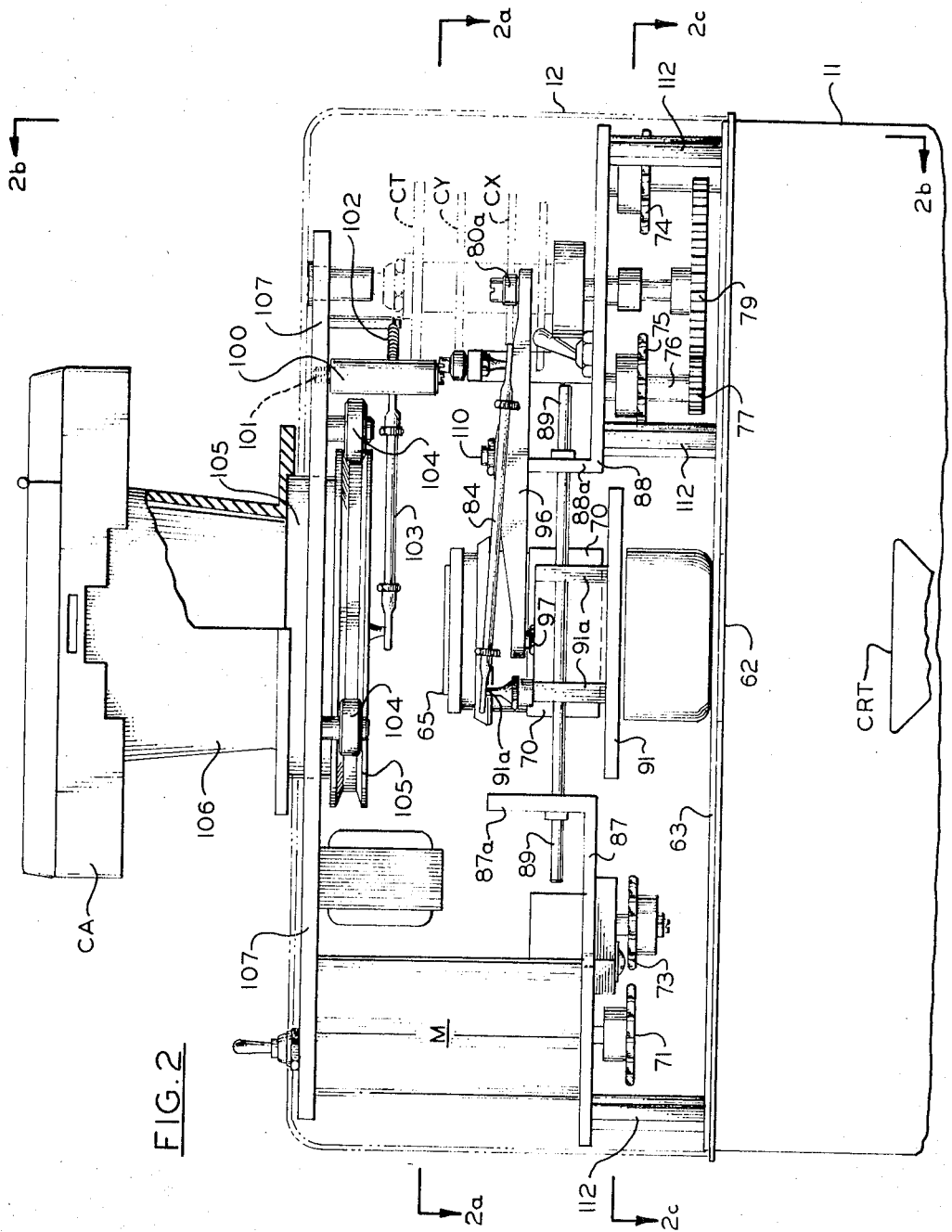
FIG. 2 is a cross-section elevation view through the positioning unit and a portion of the transmitter-receiver unit of a preferred embodiment of the invention.
Figure 2A:
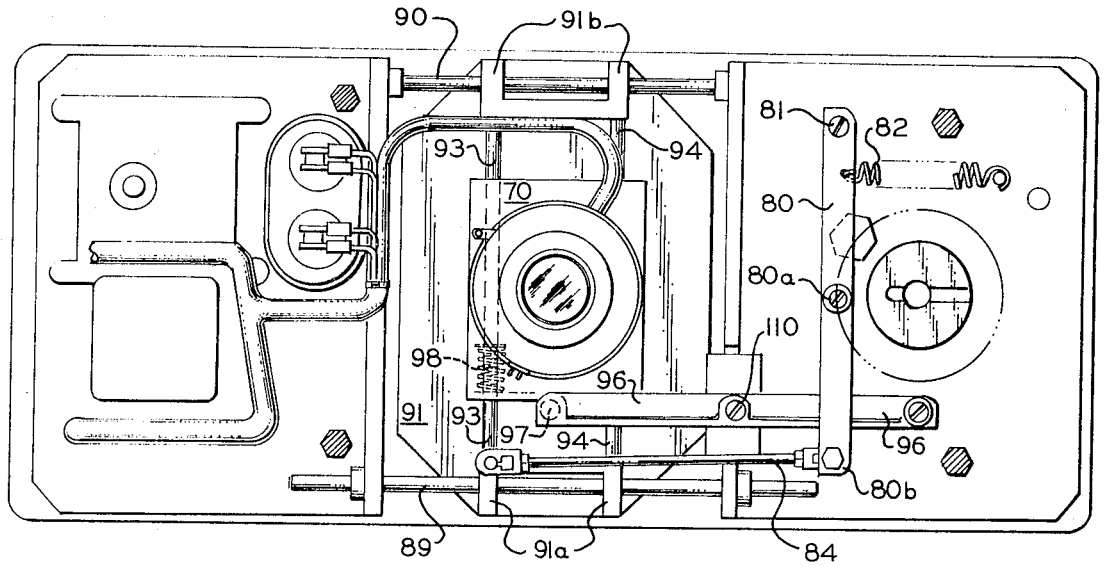
Figure 2C:
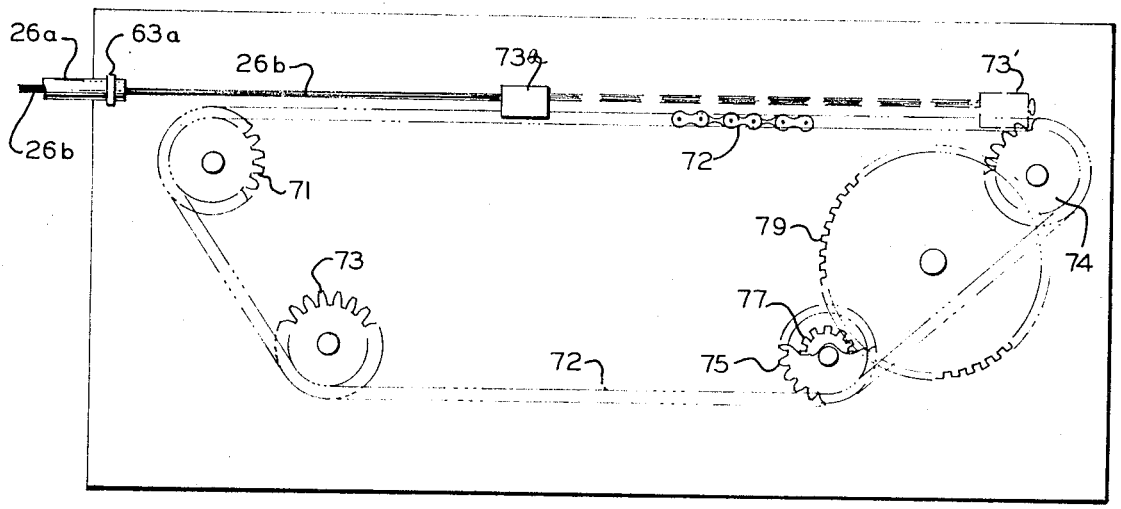

FIG. 2a is a view taken at lines 2a—2a in FIG. 2.
FIG. 2b is a view taken at lines 2b—2b in FIG. 2.
FIG. 2c is a view taken at lines 2c—2c in FIG. 2.

FIGS. 3a, 3b and 3c are geometrical views of various transducer guide shapes which are useful in understanding the operation of the invention.

Figure 4:
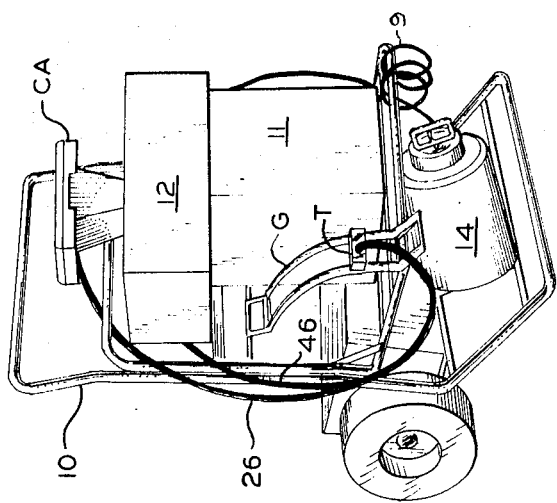

FIG. 4 is a perspective view of the overall apparatus of a preferred form of the invention.

Figure 5:
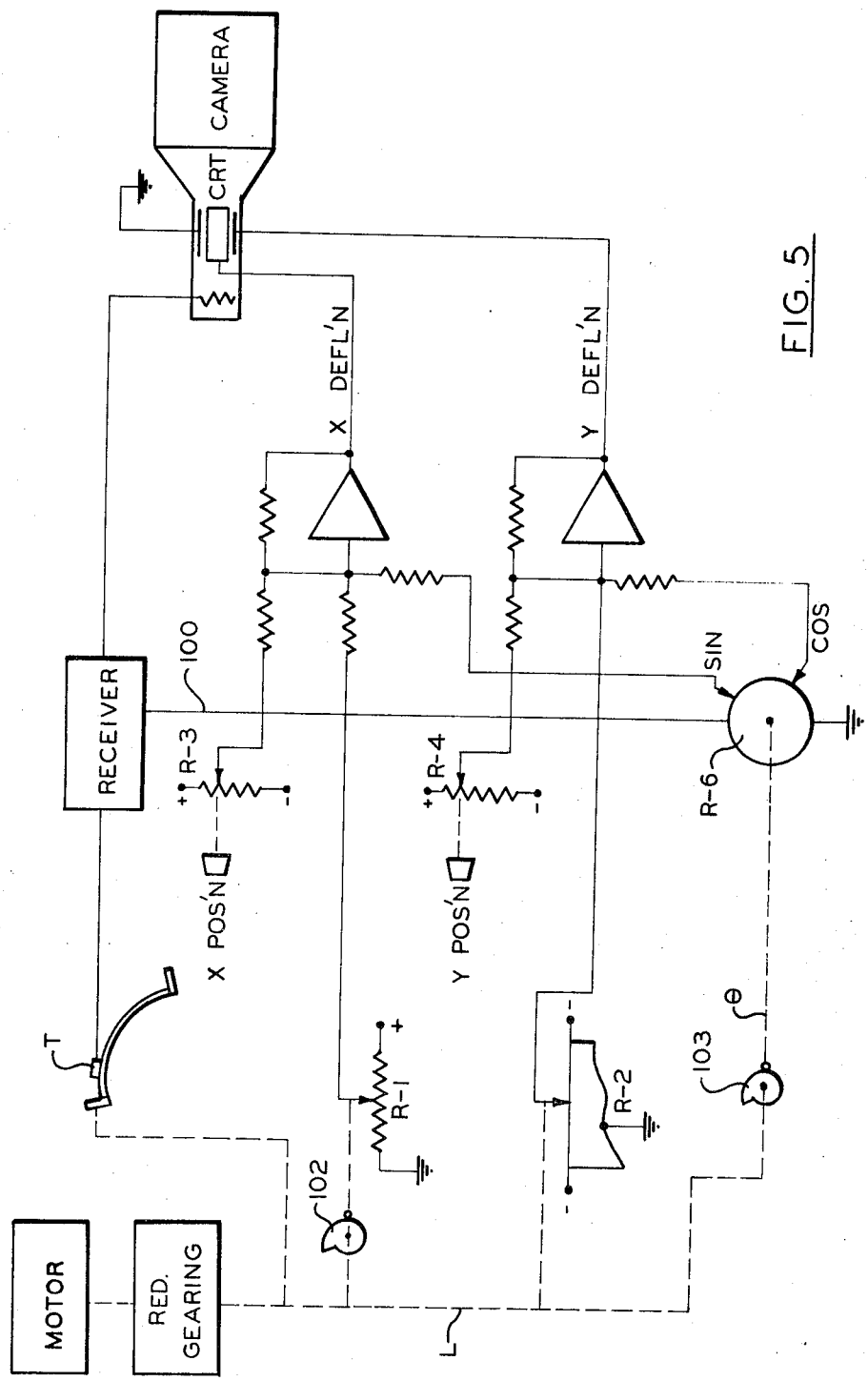

FIG. 5 is a schematic diagram of an alternative form of positioning system.

Figure 6:
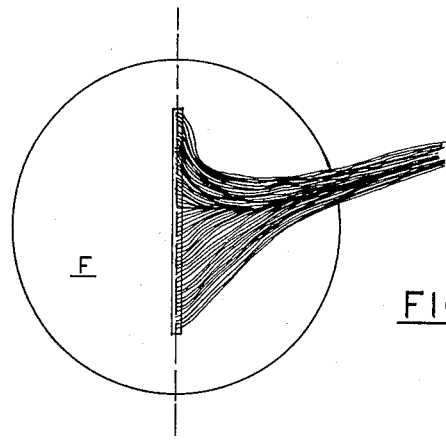

FIG. 6 is a perspective view of a fiber optic scan line pickup device useful in a further embodiment of the invention.

FIG. 6a is an electrical schematic diagram of a modified form of display device incorporating light-emitting diodes.

Figure 7:
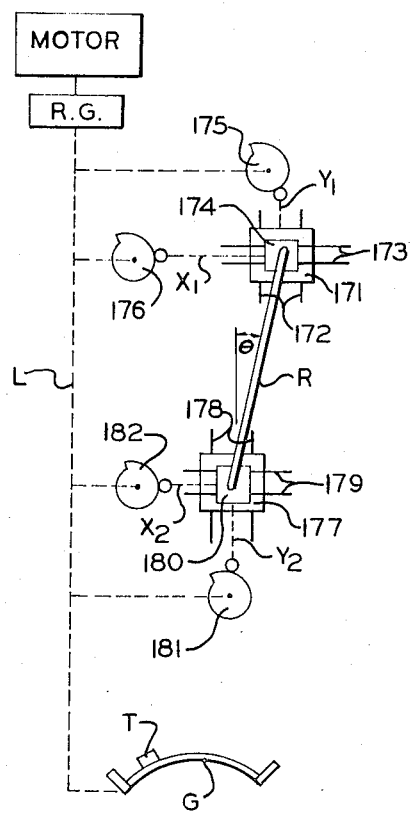

FIG. 7 is a schematic diagram illustrating the operation of one further embodiment of the invention.

Figure 8:
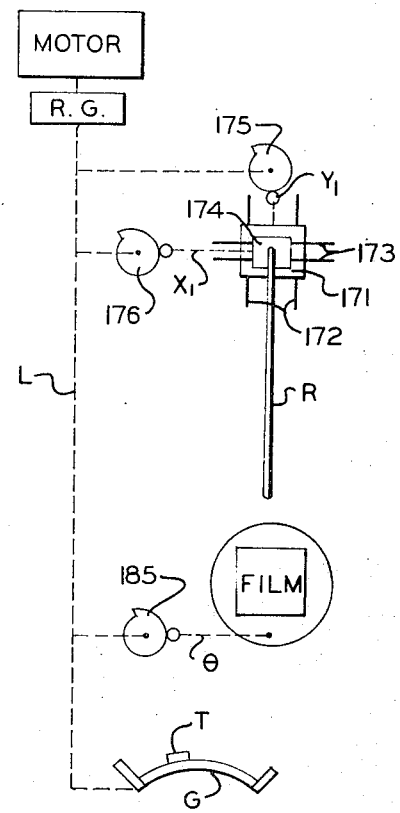

FIG. 8 is a schematic diagram illustrating the principles of operation of yet another embodiment of the invention.

Figure 9A:
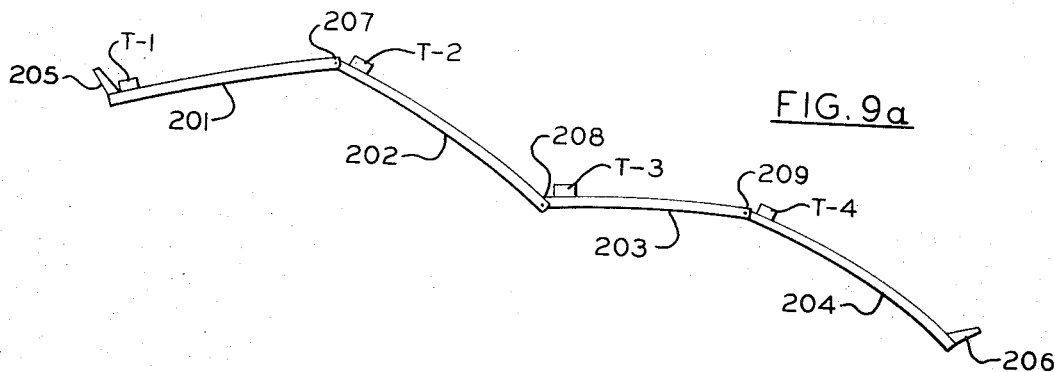

FIG. 9a is a side view of a hinged, multi-section alternative form of transducer guide.

Figure 9B:
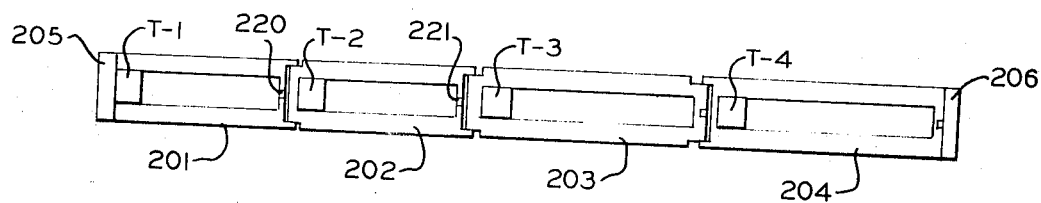

FIG. 9b is a top view of the multi-section guide of FIG. 9a.

Figure 9C:
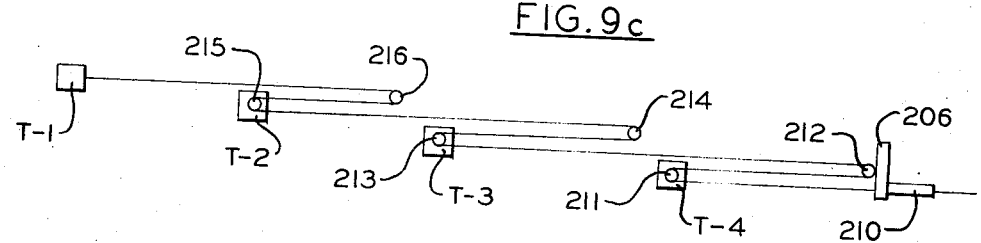

FIG. 9c is a schematic cabling diagram useful in illustrating one manner in which a single push-pull cable may be used to translate plural transducers along the plural sections of the guide of FIG. 9a.

Figure 9D:
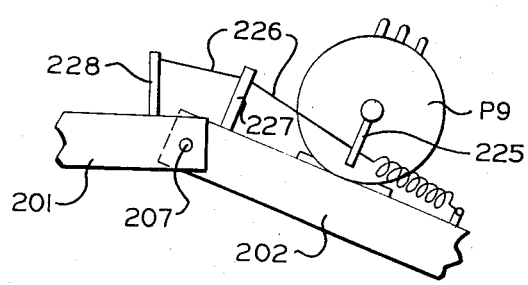

FIG. 9d is a side view of a portion of the guide of FIG. 9a showing illustrative means for measuring the angle between two sections of the multisection guide.

Figure 9E:
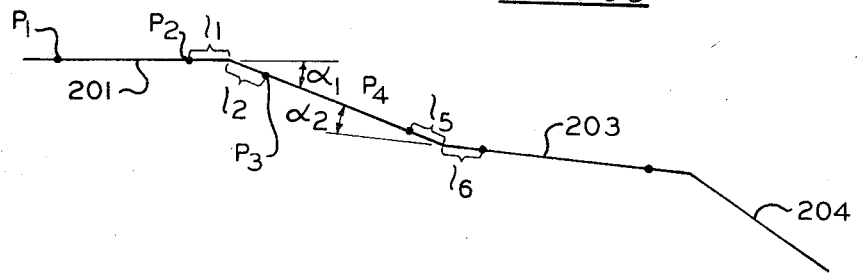

FIG. 9e is a geometric diagram useful in illustrating the operation of a multi-section guide.

Figure 9F:
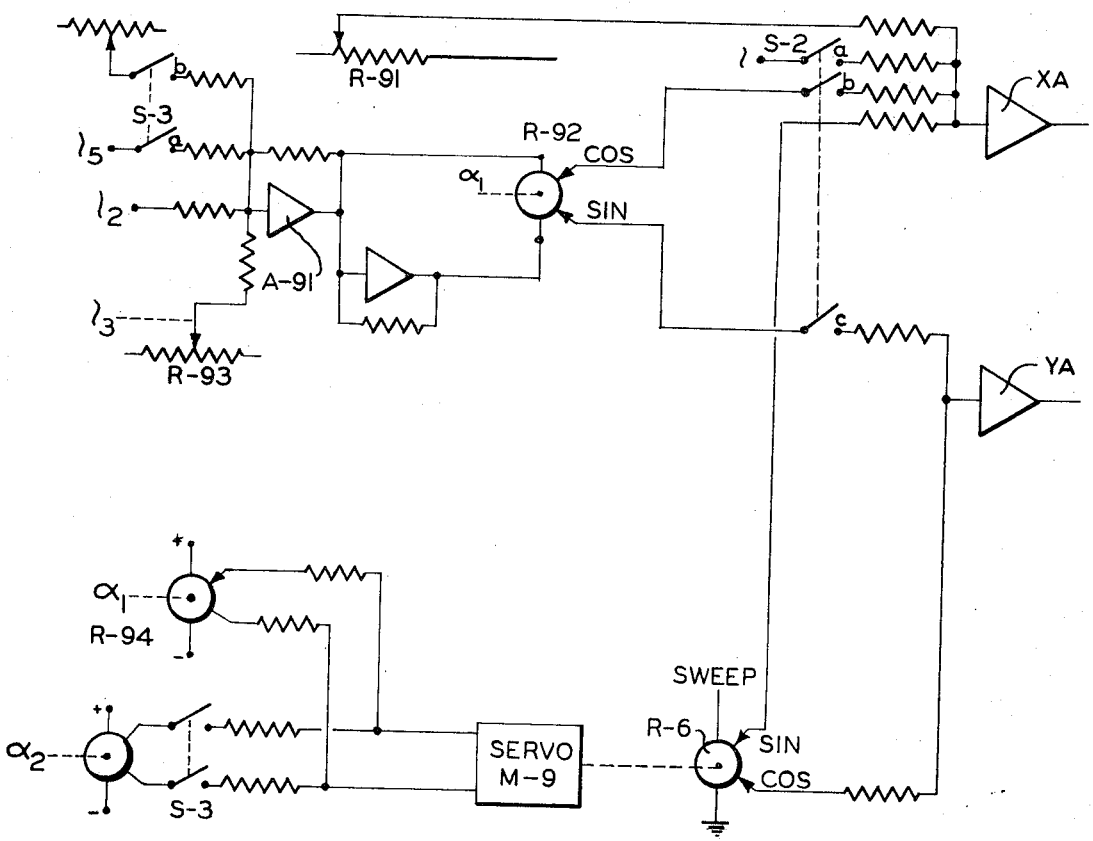

FIG. 9f is a schematic diagram of a portion of a display-positioning system which may be used with a multi-section transducer guide.

FIG. 10a is an electrical schematic diagram showing a further embodiment of the invention.

FIG. 10b is an electrical schematic diagram showing yet another embodiment of the invention.

As shown in FIG. 4, main portions of the apparatus of the invention are preferably mounted on a wheeled cart 10, and they include a commercially-available ultrasonic transmitter-receiver unit 11 which provides line traces on a cathode ray tube (not shown in FIG. 4), and a positioning unit 12 situated atop unit 11. A camera unit CA is rotatably carried on unit 12. The cart also carries pressurized fluid couplant tank 14. Electrical power is supplied to units 11 and 12 by means of cable 9. A transducer guide G shown hanging on the cart in FIG. 4 is mechanically connected to positioning unit 12 by Bowden or push-pull cable 26, the transducer T carried on guide G is electrically connected to transmitter-receiver unit 11 by means of coaxial cable 46, and fluid pressure source 14 is connected to the transducer conveyor block 25 on guide G by means of hydraulic hose 15. The two cables and the hose are preferably laced together along their length. The cable and hose lengths are typically given lengths of 12 or 15 feet, so that the guide G may be removed from the cart and placed on an animal.

Figure 1:
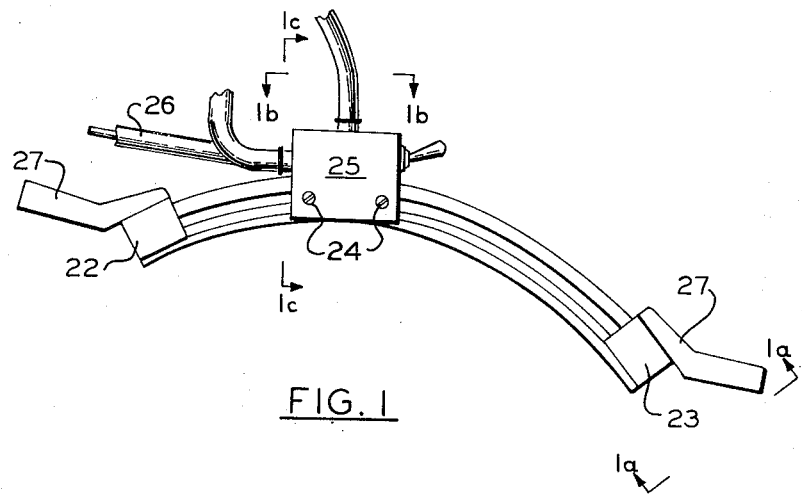
FIG. 1 is a side view of a typical transducer guide with a transducer conveyor block shown mounted thereon.
Figure 1A:
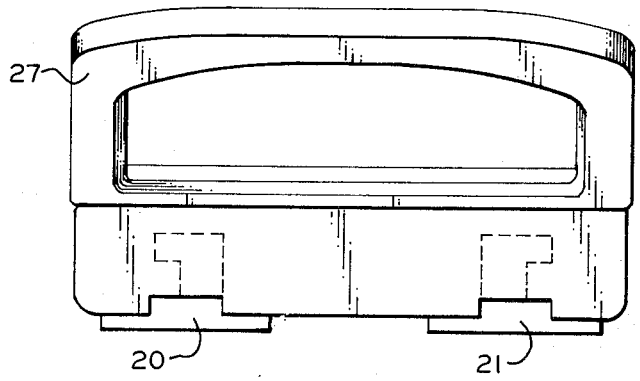
FIGS. 1a, 1b and 1c are views taken at correspondingly designated lines in FIG. 1, and FIGS. 1d and 1e are views taken at correspondingly designated lines in FIG. 1b.
Figure 1C:
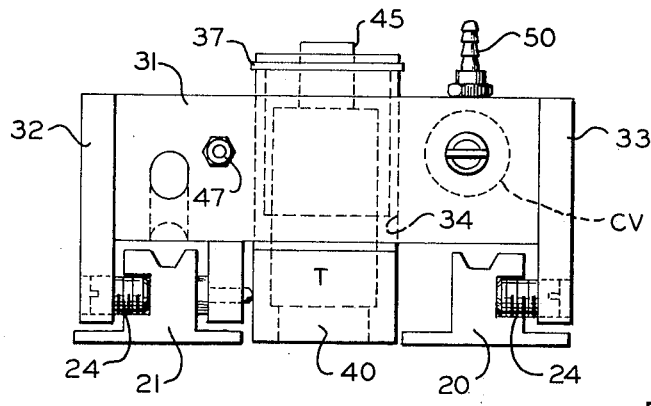
Figure 1B:
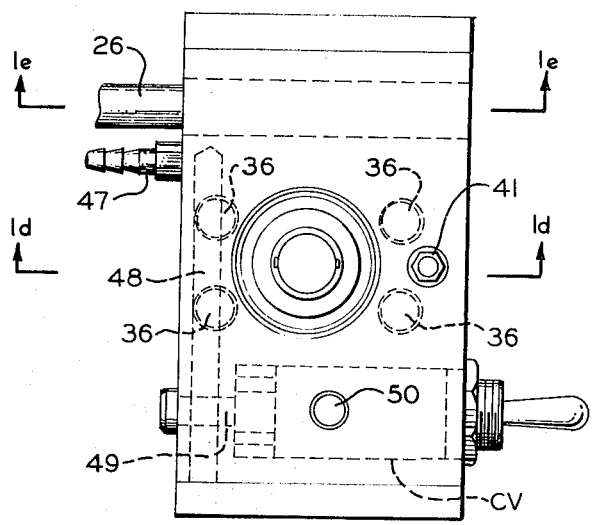
Figure 1D:
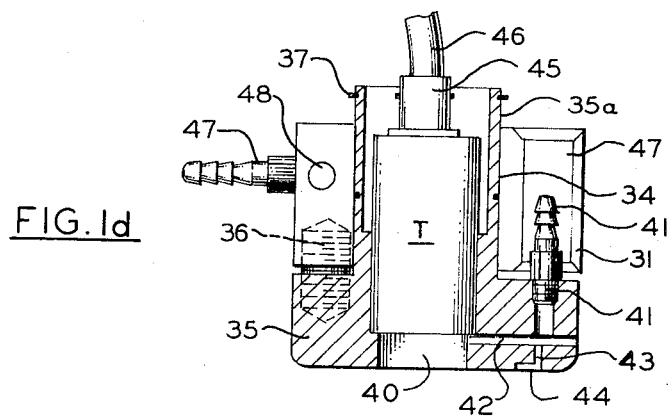
Figure 1E:
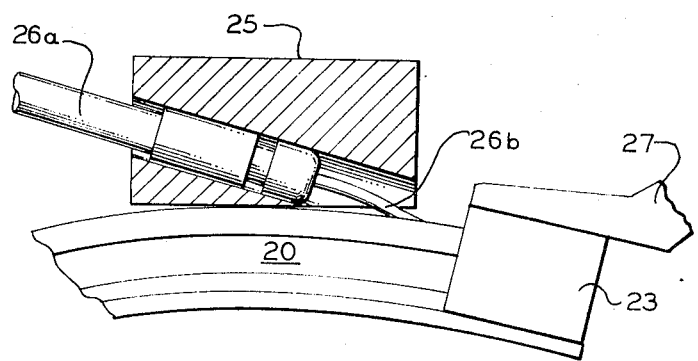

Referring now to FIGS. 1 and 1a—1e, the transducer guide comprises a pair of spaced rail or track members 20,21 which extend in a generally arcuate but ordinarily variable-radius curve between end blocks 22 and 23 to which they are fixedly attached. Transducer conveyor block 25 is slidably mounted on rails 20,21, by means of nylon bearing screws 24,24, which extend into recesses on the sides of rails 20,21. Transducer conveyor block 25 is moved along the rails by means of push-pull or Bowden cable 26, which includes an outer housing 26a and an inner pull wire 26b. The end of pull wire 26b is fixedly fastened to end block 23 (FIG. 1e). If, at the opposite end of cable 26, the pull wire is pulled out from housing 26a, it will be seen that housing 26a will push conveyor block 25 toward end block 23 of guide G. Handles 27,27 attached to end blocks 23,23 allow an operator to grasp the assembly and hold it across the generally rounded back of a hog or steer, for example. Rails 20 and 21 are typically provided with a length of 7 to 15 inches and with a varying radius, which might vary in a typical case between 6 and 8 inches, although some transducer guides used with the invention often have straight portions, which, of course, have infinite radius. In some typical applications, the motion of the conveyor block along the guide G causes the transducer carried within block 25 to scan a sector of perhaps 60° or 70°.

Transducer conveyor block 25 comprises a main body 31 having fixed thereto a pair of side plates 32, 33 (FIG. 1c) in which screws 24, 24 are threaded to slidingly hold block 25 on rails 20, 21. Body 31 includes a circular through-bore 34 through which the cylindrical tube portion 35a of a movable float block 35 extends. Four coil springs 36, 36 (FIGS. 1b and 1d) mounted in registering holes in body 31 and block 35 urge float block 35 away from body 31, downwardly as viewed in FIGS. 1c and 1d. Snap ring 37 (FIG. 1d) seated in a groove near the upper end of tube portion 35a limits downward motion of float block 35 by eventually striking the upper face of body 31. In FIG. 1d float block 35 is shown near its maximum upward position relative to body 31. As the transducer conveyor block moves along rails 20, 21, the bottom surface of float block 35 is pressed by springs 36 against the animal. If the animal contour has local variations, it will be seen that float block will move in and out of body 31 to accommodate such variations. Piezo-electric transducer T is fixedly mounted in float block 35 and hence it also rides up and down relative to body 31. Coaxial connector 45 (FIG. 1d) connects coaxial cable 46 to transducer T.

A lesser diameter portion of bore 34 below transducer T comprises a fluid couplant cavity 40 which connects the ultrasonic energy between transducer T and the animal. Hose 15 leading from pressurized fluid tank 14 connects to hose connector 47 (FIG. 1b) in body 31, and passages 48, 49 in body 31 conduct fluid to fluid control valve CV having a toggle control arm. When valve CV is opened, couplant fluid is passed through valve CV and a short jumper hose 51 (not shown) extending between fitting 50 on valve CV and hose connector 41 (FIGS. 1b and 1d). Fluid couplant jumper hose 51 passes into bore 47 (FIG. 1d) in body 31 and connects to hose connector 41 screwed into float block 35. A passage 42 leads from hose connector 41 to cavity 40, so that fluid under pressure (e.g. 5 psi) is caused to fill cavity 40. It is important to note that as float block 35 and transducer T move up and down relative to body 31, cavity 40 coupling transducer T to the animal does not change in length or diameter, and hence uniform acoustic coupling is insured even though the animal surface has irregular variations.

The transducer conveyor block, as viewed in FIG. 1d, moves from left to right as the apparatus is operated to inspect the animal. It will be seen that passage 43 also conveys couplant fluid to chamber 44 provided on the bottom surface of float block 35. As the bottom of float block 35 rubs across the animal, fluid expelled from chamber 44 pre-wets the animal areas over which cavity 40 passes shortly thereafter, thereby insuring that air bubbles entrapped by animal hairs or the like do not affect the acoustic coupling.

Referring to FIG. 1c, it can be seen that inward projecting flanges of guide rails 20, 21 can be omitted and construction of conveyor block 31 can have depending portions adjacent to float block 35 adapted to also rub on the surface of the object under inspection.

With conveyor block 25 at its leftward limit position adjacent end block 22 of guide G, operation of toggle switch SW1 on top of positioning unit 12 (FIG. 2) starts a motor M which drives block 25 along guide G and energizes an electromagnet to open the shutter of a camera, as will be described below. As the transducer T is driven along guide G, the positioning unit 12 displaces successive CRT scan lines on the film in a manner governed by the shape of guide G. When block 25 has traveled a predetermined distance along guide G, a cam-operated further switch associated with the positioning system to be described closes the camera shutter and returns the mechanism of the positioning system to a reference condition. The transducer conveyor block 25 then may be manually slid back to its original position adjacent end block 22 in preparation for the taking of a further picture. The film in the camera back which was just exposed is then removed and developed.

As shown in FIGS. 2 and 2a–2c, the upper end of the housing 11 containing the transmitter-receiver unit has an open upper side so that the scan lines on display cathode ray tube CRT are projected upwardly, through an opening 62 (FIG. 2) in base plate 63 of the positioning unit 12, which is fixedly mounted atop unit 11 by means of clamp arms 111, 111 (FIG. 2b). The scan lines on the face of CRT pass through a hollow barrel or light shield, up through a hole in platform 91 to lens 65, and are imaged by lens 65 (FIG. 2) on the film (not shown) which is carried in camera back CA in a plane parallel to the face of the CRT. Camera back CA preferably comprises the film carrier of a conventional Polaroid Land camera. Lens 65 is carried on lens stage 70, which is translated relative to the CRT and relative to the film in two coordinate directions also parallel to the film plane, by means to be described. Camera back CA is carried on camera mount 106, which in turn is carried on turntable 105, which is rotatably carried in a circular hole in upper plate 107 of positioning unit 12 and rotatably positioned by means to be described. Thus successive scan lines produced along the same line on the face of the CRT are imaged on successively different portions of the film by translating lens 65 in a plane parallel to those of the CRT face and the film, and by rotating the camera back and film in a plane parallel to the previously mentioned planes.

Plates 87 and 88 in FIG. 2 are fixedly mounted on base plate 63 and spaced therefrom by spacers 112, 112. Motor M fixedly mounted on plate 87 drives sprocket 71, thereby driving an endless roller chain 72, which extends around and drives idler sprockets 73a, 74 and cam drive sprocket 75. Roller chain 72 has been omitted from FIGS. 2, 2a and 2b for sake of clarity, and the path of the roller chain is shown in FIG. 2c. The outer casing 26a of Bowden cable 26 is fixedly attached to base 63 at 63a, and the center pull-wire 26b of cable 26 is attached to one link of roller chain 72 by pull block 73 (FIGS 2b and 2c). As rotation of motor M moves clamp rightwardly as viewed in FIG. 2c, thereby pulling a length of pull-wire 26b out from casing 26a, the transducer conveyor block 25 will be moved along guide G in the manner explained above in connection with FIGS. 1 and 1a–1e. Simultaneously, the motion of chain 72 rotates cam stack drive sprocket 75 and cam stack drive pinion 77 which is pinned to the same shaft 76 as sprocket 75. Pinion 77 meshes with and drives cam stack drive gear 79 and cam stack CS, which includes a set of cams CP, CX, CY and CT, all of which are keyed to the shaft driven by gear 79, and all of which are shown in phantom in FIGS. 2 and 2b for sake of clarity.

Upwardly-extending flanges 87a, 88a of plates 87, 88 support a pair of X guide rods 89, 90 extending between them. A movable platform 91 has upwardly-extending front and rear pedestals 91a, 91b slidingly carried on front rods 89 and rear rod 90, so that platform 91 is movable, leftwardly and rightwardly as viewed in FIG. 2. A pair of Y guide rods 93, 94 (FIG. 2a) extend between front pedestal 91a and rear pedestal 91b of movable platform 91, and lens stage 70 is slidingly mounted on guide rods or rails 93, 94. Thus lens stage 70 and lens 65 may be positioned in the X direction by sliding movement of platform 91 along rods or rails 89, 90, and may be positioned in the Y direction by sliding movement along guide rods or rails 93, 94.

Rotation of cam CX with the periphery of cam CX in engagement with cam follower roller 80a on arm 80 causes arm 80 to pivot about point 81 (FIG. 2a) against the force of tension spring 82, which holds arm 80 against the periphery of cam CX. End 80b of arm 80 is pivotally connected to one end of X drive rod 84, the other end of which is pivotally connected to platform 91 at 91a, thereby moving platform 91 and lens stage 70 in the X direction along rails 89, 90.

Rotation of cam CY causes arm 96 to pivot about fixed pivot 110 so that roller 97 on the other end of arm 96 urges lens stage 70 along guide rails 93, 94, against the force of compression spring 98, (FIG. 2a) one end of which is fixedly secured at a point along guide rail 93, and the other end of which presses against lens stage 70. Because roller 97 engages a face of lens stage 70 which extends parallel to guide rails 89, 90, it will be seen that the X movement of the lens stage 70 by cam CX does not affect the amount of lens stage Y movement which a given rise of cam CY will cause.

Rotation of cam CT causes arm 100 to rotate about fixed pivot-point 101, against the force of tension spring 102 (FIG. 2b) connected between arm 100 and stationary upper plate 107. Link 103 (FIG. 2) is pivotally connected at one end to arm 100 and at its other end to a point near the periphery of circular turntable 105, which is rotatably suspended from upper plate 107 by a plurality of rollers 104, 104 which seat in a V-groove extending around the base of turntable 105. It will be apparent that movement of arm 100 and link 103 by rotation of cam CT causes turntable 105, and hence the camera back CA and film, to rotate about the central axis of the turntable.

Cam CP of the cam stack is arranged to trip toggle switch SW-2 when the cams of the cam stack have rotated a predetermined amount, thereby interrupting rotation of the cam stack and translation of the transducer along the transducer guide. The tripping of toggle switch SW-2 also closes the electromagnetically-operated shutter associated with the lens, and then causes motor M to reverse, so that the drive chain and cams are returned to their original starting position. Switch SW-2 releases a "hold" relay (not shown) which is closed by momentary operation of switch SW-1 to its "start" position and which is provided with a holding or sealing auxiliary contact. The holding contact is also wired in series with a normally-closed contact on switch S-1 which is opened by momentary operation of switch SW-1 to its "stop" position. Thus the scanning action may be stopped at any time by actuation of switch SW-1, which is very useful where it is desired to record several separate scanned areas on a single piece of film.

Inasmuch as the end of Bowden cable pull-wire 26 is clamped directly to chain 72 and the four cams of the cam stack are rotated by a direct gear drive (75, 73, 79), it will be apparent from FIG. 2c that rotation $\phi$ of the cams will be directly and linearly proportional to the translation of the transducer along the transducer guide G.

Referring to FIG. 11, in an alternate construction the transducer is fixed to body 31 by bridge 31A, following only the guide path while float block 35 rubs on the object under inspection and follows its contours, couplant fluid chamber 40 height changing accordingly. This construction allows use of a non-conforming guide on an object while the imaged scan lines depict the object shape properly.

In FIG. 3a, if transducer T moves along a straight guide from a beginning point $L_o$ to an end point $L_F$, where the guide extends in the X direction, the Y direction is perpendicular thereto, $\theta$ is the angle between the direction of the scan line and the Y direction, and L is the distance along the guide measured from point $L_o$, the following relationships will be seen to exist:

$dx/dL = k_1$, i.e. that $x$ varies linearly with $L$, so that the base end of the scan lines should move linearly in the X direction on the film as the transducer moves along the guide;

$dy/dL = 0$, i.e. that y does not change, so that the base end of successive scan lines should not shift in the Y direction on the film as the transducer moves along the guide; and, $d\theta/dL = 0$, i.e. that the direction of the scan lines on the film should not change as the transducer is moved along the guide. It will be seen that all of the successive scan lines will be parallel to each other, so that none of them will intersect.

Referring now to FIG. 3b, where a perfectly arcuate or circular guide is shown, the following different relationships will be seen to exist:

$$dx/dL = k_1 \cos \theta$$

$$dy/dL = k_1 \sin \theta$$

$$d\theta/dL = k_2$$

It will be seen that the directions of all of the successive scan lines will intersect at a common point P.

FIG. 3c shows a guide which is neither straight nor circular. It will be seen that various scan lines intersect at a variety of points. Further, for various empirical curved, or partially straight-partially curved guides, it will be apparent that the $dx/dL$, $dy/dL$ and $d\theta/dL$ functions will not be constants nor simple sine or cosine functions of L, the transducer distance along the guide. If the guide is provided with a hump, as shown in FIG. 3c, it will be seen that one (or more) of the functions may change in sign over their intervals of interest, $L_o$ to $L_F$. However, for any particular guide, one may plot values of these three functions in a straightforward manner and provide cams which vary in radius in accordance with the respective functions. In the device of FIGS. 2 and 2a–2c, cams CX, CY and CT of a given cam stack are provided with radii which vary substantially in accordance with the $dx/dL$, $dy/dL$ and $d\theta/dL$ characteristics, respectively, of the particular transducer guide with which the cam stack is to be used. For greatest precision, the three radii should not vary *exactly* in accordance with those characteristics, but should also take into account the non-linearities in the pivot arm arrangements utilized. In the system shown, if X drive rod 84 remains substantially aligned in the X direction over the entire range of travel, and if the total angular motion of arm 96 about pivot point 110 is confined to small angles, the non-linearities of these pivot arm arrangements introduce negligible error. Also, if arm 103 connected to rotate turntable 105 continues to point in approximately the same direction throughout the entire range of travel, its pivotal connection to turntable 105 will introduce very little error. It will become apparent to those skilled in the art that the non-linearities introduced by the three crank or pivot arrangements may be made very small by the use of longer pivot arms and links, at a sacrifice of making the mechanism somewhat larger and heavier. Where the X, Y and $\theta$ movements required for a given transducer guide are great enough that the use of short pivot radii would cause unacceptable inaccuracy, it will be apparent that the three cam radii may be modified from the $dx/dL$, $dy/dL$ and $d\theta/dL$ characteristics of the guide to completely compensate for the pivot linkage non-linearities.

Figure 2D:
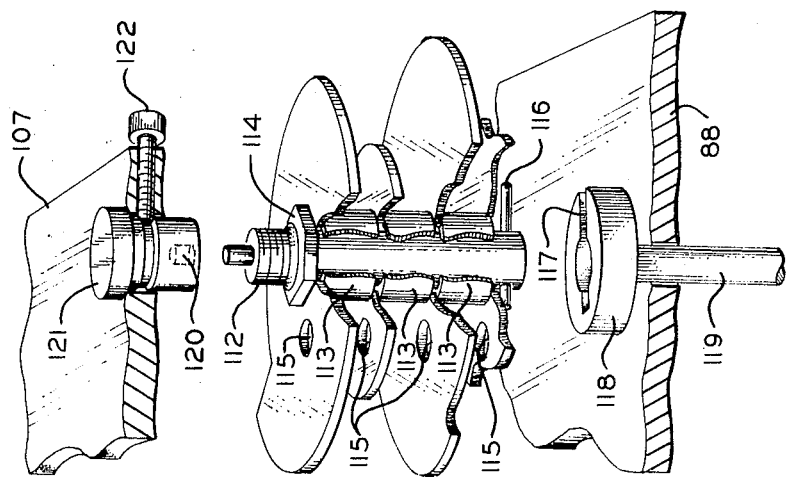

Since a different set of cams must be used with each different transducer guide used with the apparatus, it is highly desirable that insertion and removal of different sets of cams be effected easily and rapidly. As shown in FIG. 2d, the four cams are all carried on shaft 112 with three spacers 113 between them, and with nut 114 threaded onto shaft 112 to clamp the cams and spacers tightly between nut 114 and pin 116. Holes 115, 115 provided in the four cams allow the cams to be angularly phased relative to each other, by passing a bar through the four holes. Pin 116 passing through the bottom of shaft 112 engages slot 117 in disc 118 on the end of shaft 119, which is driven by sprocket 79 (FIG. 2). The reduced-diameter upper end of shaft 112 seats in a cylindrical recess 120 in removable keeper or bearing 121, which is held in upper plate 107 with set screw 122. By loosening set screw 122 and lifting keeper 121 upwardly from plate 107, the entire cam stack can be lifted so that pin 116 clears slot 117, after which all four cams may be withdrawn laterally from between plates 88 and 107, and a different set of cams readily substituted.

In the modified embodiment illustrated schematically in FIG. 5, the camera is mounted fixedly relative to the display CRT, and neither translates nor rotates relative thereto. The transducer T signal, amplified and gated by the receiver, connects to the CRT intensity control circuit in conventional fashion. The receiver also contains a sweep generator which applies an output on line 100 to deflect the beam as the reflected energy is received, and a conventional blanking circuit, not shown. In order to translate the display in X and Y directions as the transducer moves along guide G, the motor drive moves the arms of two potentiometers R–1 and R–2. In FIG. 5 potentiometer R–1 is assumed to be a linear potentiometer, and its arm is moved by non-linear cam 102, while the arm of potentiometer R–2, which is assumed to be a rotary non-linear potentiometer, is moved directly by the motor drive output shaft.

The two potentiometers are shown as two different types solely for sake of variety, and both can be the same type, of course. Either can be a rotary potentiometer or a linear-motion potentiometer. While pot R–2 is shown as a wire-wound pot provided with a varying card width, the desired non-linear arm displacement versus output voltage characteristic can instead be provided by use of taps and/or shunting registers, as is well-known in the analog computer art. Cam 102 is provided with $dx/dL$ characteristic of guide G, and the winding of potentiometer R–2 is provided with a voltage versus shaft position characteristic corresponding to the $dy/dL$ characteristic of guide G. The two voltages from the two potentiometers may be applied to the same points of the CRT circuit as where the two X and Y positioning control voltages are normally connected, and in FIG. 5 two such positioning controls are indicated at R–3 and R–4. Potentiometer R–2 is shown for sake of illustration with a grounded tap and two voltages of the same polarity connected to the ends of its winding, which will cause the display to be removed first in one direction along the Y axis and then in the reverse direction as the arm of R–2 is moved from near one end of the winding to the other end, while potentiometer R–2 has a single potential gradient across its winding so as to provide display motion in a single direction. The system as thus far described in FIG. 5 can utilize cam means for rotating the camera film relative to the display in the same manner as that used in the main embodiment. However, by provision of cam 103 and sine-cosine potentiometer or resolver R–6, the entire display on the CRT may be rotated automatically as the motor adjusts the arms of the resolver potentiometer. Cam 103 is provided with the $d\theta/dL$ characteristic appropriate for guide G, thereby rotating the shaft of resolver R–6 in accordance with $\theta$ as the transducer moves along the guide. When $\theta$ equals zero, the full sawtooth sweep output on line 100 is applied to the Y deflection circuit and none of the sweep output is applied to the X deflection circuit, so that the sweep proceeds in the Y direction. If $\theta$ increases to 90°, the full sweep output will deflect the beam in the X direction, and hence it will be seen that the direction of the scan line in the CRT face always extends in the direction of the instantaneous $\theta$ value. While the CRT in FIG. 5 is shown using single-ended or unbalanced deflection for ease of illustration, push-pull or balanced electrostatic deflection may be substituted, of course, and it will be apparent to those skilled in the art that electromagnetic deflection may be substituted, if desired. In lieu of using cams or non-linear potentiometers, voltages similar to those derived by potentiometers R–1 and R–2 in FIG. 5 may be derived by means of linear potentiometers driven by the motor drive output shaft and followed by non-linear function generators, such as biased diode function generators, which are well-known in the analog computer art and described, for example at pages 233 et seq. of "Electronic Analog and Hybrid Computers" by Korn and Korn, McGraw-Hill, New York, 1964.

In some modified embodiments illustrated in connection with FIGS. 6, 7 and 8 the CRT trace is not imaged directly onto the film plane by a movable lens, but instead it is relayed from the CRT face to appear at an elongated rod which is moved relative to the camera film as the transducer moves along the guide, so as to properly trace the picture on the film. As shown in FIG. 6, a first rod is fixed adjacent the CRT face F to cover the vertical traces made on the face of the CRT by reflected sound energy. One or more columns of light-transmitting optical fibers are spaced along the length of the rod, with successive fibers in a column preferably closely spaced together, with each fiber extending through the rod, so that each fiber will receive light when light appears at a given point in the CRT trace. The optical fibers each extend, in a flexible bundle, to a second similar rod, through which they pass and terminate. The fibers are terminated in the second rod in the same relative relationship or other as in the first rod, so that the trace produced on the CRT is recreated on the lower face of the second rod. The second rod is moved relative to the film plane as the transducer moves along a guide, thereby producing a picture on the film. It is desirable that a lens be used between the second rod and the film plane. If desired, the ends of the glass fibers may be formed in known manner so as to provide the effect of a lens.

Rather than using optical fibers to relay the trace to the movable second rod, it may be done electrically. If the stationary rod fixed over the CRT trace comprises a column of photosensors, such as photodiodes or phototransistors, the signals derived therefrom may be connected, through amplification, if desired, (using either a number of amplifiers or a multiplexing scheme) to illuminate light-emitting (e.g. galenium arsenide) diodes arranged in a column along the second rod, thereby to reproduce scan lines at the second rod. The rods R previously described and/or the cathode ray tube may be replaced by a linear array of light-emitting (e.g. galenium arsenide) diodes. The linear array may be placed adjacent the film audit or the film. Either the linear array or the film or both of them may be moved relative to each other to provide the desired $dx/dL$, $dy/dL$ and $d\theta/dL$, characteristics, or the image of the linear array may be moved by lens motion, using various of the several image-positioning techniques disclosed herein. FIG. 6a schematically illustrates a linear array LA of light-emitting or electroluminescent devices, each of which is connected to the output from the ultrasonic receiver and to a respective stage of an electronic counter, which is assumed to activate one of its output lines at a time. A binary counter and conventional decoder or shift register may provide equivalent operation. As reflected energy is received by the ultrasonic receiver, an oscillator applies pulses to advance the counter. If reflected energy causes a positive excursion at the receiver output, the counter is arranged so that the line indicating the count has a negative output. Thus the greater the voltage on the receiver output line when the counter applies a low voltage to a given diode, the more light will be emitted by the diode. Thus it will be seen that the array provides a line light pattern similar to that on a cathode ray tube using single-axis deflection.

The second rod may be moved relative to the film and parallel to the film plane in several ways, two of which are shown schematically in FIGS. 7 and 8. In FIG. 7 the motor drives transducer T along guide G, and the motor drive shaft position equals the quantity L. The upper end of the second rod, R, is pivotally attached to a first XY carriage arrangement comprising a base carriage 171 mounted to slide on fixed tracks or ways 172, 172 extending in the Y direction. Base carriage 171 carries tracks or ways 173, 173 which extend in the X direction, and upper carriage 174 is mounted to slide along tracks 173,173. Cam 175 driven by the motor is provided with a $dy/dL$ characteristic to move base carriage 171 along tracks 172, 172 against the force of a compression spring (not shown), and cam 176 driven by the motor drive is provided with a $dx/dL$ characteristic to move upper carriage 174 along tracks 173, 173 against the force of a compression spring (not shown). Thus cams 175 and 176 position the upper or base end of rod R in the same manner in which cams CY and CX position the lens stage in the specific embodiment of FIG. 2.

The lower end of rod R is pivotally attached to a second XY carriage assembly comprising a base carriage 177 mounted to slide on tracks 178, 178 extending in the Y direction. Base carriage 177 carries tracks or ways 179, 179 which extend in the X direction, and upper carriage 180 is mounted to slide along tracks 179, 179 The lower end of rod R is pivotally (or slidingly) attached to upper carriage 180.

The following relationships will be seen to exist:

$$(X_1-X_2/Y_1-Y_2) = \tan \theta = \sin \theta / \cos \theta$$

$$X_2 = X_1 - V \sin \theta$$

$$Y_2 = Y_1 - V \sin \theta$$

where $V$ is the length of the rod R between its two pivot points.

Cam 181 may be provided with a $Y_1-V \cos \theta$ or $dy/dL-V \cos \theta$ characteristic to move base carriage 177 along ways 178 against the force of a compression spring (not shown), and cam 182 may be provided with an $X_1-V \cos \theta$ $dx/dL-V \cos \theta$ characteristic to move upper carriage 180 along ways 179,179 against the force of a compression spring (not shown). Thus by provision of two separate X–Y translation systems, the angular positioning of rod R to the proper value of the angle $\theta$ is accomplished. If the system were intended for use with only perfectly circular transducer guides, it will become evident that the lower end carriage assembly could be replaced by a fixed pivot.

The translatory and angular position of a rigid body such as rod R may be specified by three quantities, and hence only three of the cams shown in FIG. 7 are necessary, assuming that the value of the angle $\theta$ never exceeds 90 degrees. Since the Y translation of carriage 177 is small in ordinary applications where $\theta$ does not exceed 90 degrees, for example, cam 181 may be eliminated for such applications. In fact, the provision of four cams which act to position a body having only three degrees of freedom is undesirable, in that the cams must be cut with great precision to prevent the mechanism from binding. However, in applications where $\theta$ may exceed 90°, it is sometimes difficult to provide proper Y positioning of the lower end of rod R without binding by means which act only in the X direction on the lower end of the rod. Therefore, in actual practice in applications which involve large $\theta$ angles, we prefer that cams 181 and 182 not have precisely the characteristics mentioned above. Instead, cam 181 is undercut (i.e. provided with a smaller radius than that specified above) along a portion of its periphery corresponding to $\theta$ angles where the $X_2$ position is changing rapidly with $\theta$, so that cam 181 is inoperative during that portion of operation and cam 182 fixes the angle $\theta$ of rod R by determinating the $X_2$ position. Similarly, cam 182 is undercut along a portion of its periphery corresponding to $\theta$ angles where the desired $Y_2$ position is changing rapidly with $\theta$, so that cam 182 is inoperative during that portion of the operation, and cam 181 fixes the angle $\theta$ of rod R by determining the $Y_2$ position. Thus as the transducer moves along the guide, at some predetermined point one of cams 181, 181 assumes control of the positioning of the lower end of rod R, while the other relinquishes control.

FIG. 8 schematically illustrates a system using a movable rod R which is otherwise much like the system of the main embodiment of FIG. 2. In FIG. 8 rod R is fixedly rather than pivotally attached to the upper carriage assembly, so that the rod always extends in the Y direction. Carriages 171 and 174 are positioned in the same manner as in FIG. 7, and rotation of the scan lines on the film plane is provided by rotation of the camera film relative to rod R, by cam 185, which operates in the same manner as cam CT in the main embodiment of FIG. 2.

A modified form of transducer guide illustrated in FIGS. 9a to 9f includes a plurality of rigid sections 201 to 204 spaced end to end, with handles 205 and 206 provided on the end sections, and with adjoining ends of separate sections hinged together, as at 207–209. A separate transducer is arranged to slide along each section, four transducer conveyor blocks carrying four separate transducers being shown in FIG. 9a at T–1 to T–4. The four conveyor blocks are arranged so that they traverse their respective sections of the multi-section guide in succession, and one exemplary simple manner in which the conveyor blocks may be made to successively move is illustrated schematically in FIG. 9c. The outer casing of a push-pull cable 210 is affixed to handle 206, while the inner wire or core passes through a hole in the handle to be reaved about a group of pulleys and eventually to have its outer end clamped to conveyor block T–1. The core of cable 210 passes from handle 206 around pulley 211 carried on block T–4, then around pulley 212 carried on handle 206 at the right end of section 204, then around pulley 213 carried on block T–3, then around pulley 214 mounted at the right end of section 203, then around pulley 215 mounted on block T–2, then around pulley 216 mounted at the right end of section 202, then to block T–1.

Blocks T–1 to T–4 are mounted on their respective sections of the guide to slide with significantly differing amounts of friction, with block T–1 sliding easiest and block T–4 sliding with the most friction. As the core is pulled rightwardly from cable 210 in FIG. 9c, it will be seen that block T–1 will first slide rightwardly along section 201, with the other three blocks remaining stationary because of the greater force needed to slide them. However, when block T–1 hits a stop 220 at the right end of section 201, further pull on the core of cable 210 will begin to move block T–2 rightwardly, since it will slide more easily than blocks T–3 and T–4.

When block T–2 strikes stop 221 at the right end of section 202, further pull on the core of cable 210 will move block T–3 rightwardly, and so forth.

The time at which one conveyor block stops moving along its section and another block begins to move may be sensed either by use of limit switches which close when the blocks strike their stops, or by sensing the increased motor load current required as a block having more sliding friction is moved. A single coaxial cable may be trained along the multi-section guide with each of the transducers carried by blocks T–1 to T–4 connected to the cable through a respective switch, so that a single one of the four transducers is connected to the cable at any one time, while it is traversing its respective section of the multi-section guide.

Each section of the multi-section guide may be curved or straight, and a multi-section guide may use some straight guides and some curved guides, if desired in order to fit some particular animal contour.

At the points where one guide section is hinged to another guide section, means are provided to sense the angular relationship between the two sections. In FIG. 9d wherein the ends of a pair of adjacent sections 201, 202 are shown a conventional rotary potentiometer P9 is shown fixedly mounted on section 202. Arm 225 connected to rotate the wiper arm of the potentiometer is connected by cord or wire 226 through a hole in pad 227 to pad 228 carried on guide section 201. As the angle between sections 201 and 202 is changed, it will be seen that the wiper arm of the potentiometer will be rotated against the force of tension spring 229 thereby providing an electrical voltage which is a measure of the angle between sections 201 and 202. In practice, potentiometer P9 usually comprises a resolver potentiometer having sine and cosine outputs, as will be seen below.

As the transducer in block T–1 completes its scanning as block T–1 strikes its right end stop, and the transducer in block T–2 then begins to transmit and receive, it will be seen that the line traces being recorded on the film should be quickly jumped from a position consonant with the stop position of T–1 to a position consonant with the beginning position of T–2. With means provided to measure the angle between sections 201 and 202, and knowing the distances between the transducer limit positions and the hinge point, such a re-positioning can be easily effected. Knowing the angle between the two sections, it will be seen that the proper X and Y coordinates of the T–2 starting position can be readily derived. The angle between the two sections also will be seen to materially affect the X and Y translations which should accompany movement of block T–2 along section 202.

FIGS. 9e and 9f illustrate portions of a slightly simplified system wherein each of the four sections 201 to 204 of the transducer guide are assumed to be linear. Also, the first section 201 of the guide is assumed to extend in the X direction. While the first transducer, in block T–1, moves along section 201 from point $P_1$ (FIG. 9e) to point $P_2$ and transmits and receives, potentiometer R–91 in FIG. 9f applies an increasing voltage to the X position amplifier XA. When block T–1 reaches point $P_2$ in FIG. 9e, switch S–2 is closed. A voltage commensurate with distance $l_1$ in FIG. 9e is applied to amplifier XA via contact a of switch S–2, a voltage commensurate with the distance $l_2 \cos \alpha_1$ in FIG. 9e is applied to amplifier XA via amplifier A–91, resolver R–92 and contact b of switch S–2, and a voltage commensurate with the distance $l_2 \sin \alpha_1$ is applied to amplifier YA via amplifier A–91, resolver R–92 and contact c of switch S–2. The origin of the deflection system then will be seen to reside at point $P_3$ in FIG. 9e. The sine and cosine outputs of resolver R–94 are connected to position servo M–9, which is located back near the receiver, to the angle $\alpha_1$, the angle between sections 201 and 202, and servo M–9 positions resolver R–6 to resolve the sweep voltage in the same manner as in FIG. 5.

As block T–2 drives along section 202, the arm of potentiometer R–91 traverses a shorted section of the potentiometer winding, but potentiometer R–93 applies an increasing voltage to amplifier A–91, so that a voltage commensurate with distance $l_3 \cos \alpha_1$ is applied to amplifier XA and a voltage commensurate with distance $l_3 \sin \alpha_1$ is applied to amplifier YA, where $l_3$ is the instantaneous distance of block T–2 from point $P_3$ in FIG. 9e. When block T–2 reaches point $P_4$ in FIG. 9e closure of switch S–3 causes a voltage commensurate with the distance $l_5 \cos \alpha_1$ to be applied to amplifier XA and a voltage commensurate with the distance $l_5 \sin \alpha_1$ to be added to amplifier YA. Simultaneously, a voltage commensurate with the distance $l_6 \cos (\alpha_1 - \alpha_2)$ is applied to amplifier XA, a voltage commensurate with distance $l_6 \sin (\alpha_1 - \alpha_2)$ is to amplifier YA, and resolver R–6 is re-positioned by servo M–9 to the angle $(\alpha_1 - \alpha_2)$, thereby referencing the sweep origin at point $P_5$ in FIG. 9e. As the other blocks move along their respective sections, similar voltages are sequentially added to the X and Y positioning systems and used to rotate the sweep sweep resolver. The outputs of amplifiers XA and YA are applied to the CRT deflection circuits in the same manner as in FIG. 5.

While a conventional cathode ray tube has been illustrated as the display-producing means, it will become apparent to those skilled in the art that equivalent devices, such as linear arrays or matrices of electroluminescent elements, may be substituted without departing from the invention.

In the modified embodiment illustrated schematically in FIG. 10a, the camera film (not shown) is mounted fixedly relative to the display device, CRT, and neither translates nor rotates relative thereto. The reflected sound energy signal from transducer T on guide G is connected to the receiver where it is amplified and gated in conventional fashion and applied to the CRT intensity control circuit in conventional fashion. The transmitter-receiver also contains a conventional sweep generator which applies sawtooth output on line 250. As motor M8 drives transducer T (through reduction gearing and a push-pull cable) along guide G, the motor also operates cam-operated switch S-9 to send pulses which advance electronic digital counter CNTR–10. The output of counter CNTR–10 is applied to read-only memory ROM to provide read addresses simultaneously to four sections of memory ROM. A different memory is provided with each differently-shaped guide. The four sections of the memory contain successive values of the $dx/dL$ and $dy/dL$ functions associated with a given guide, and successive values of $\cos \theta$ and $\sin \theta$ appropriate for the guide. The four digital (parallel by bit) signals read from memory ROM at any given time are applied as respective inputs to four digital-to-analog converters 251–254. The sawtooth sweep signal from the transmitter-receiver is applied as the analog reference input to the selected converters or DACs, and hence those DACs each operate to provide an analog output signal commensurate with the instantaneous valve $S_t$ of the sawtooth sweep voltage multiplied by the value of the digital signal applied to it from the memory. The output signals from DACs 251 and 252 are summed into the cathode ray tube X deflection system, and those from DACs 253 and 254 are summed into the Y deflection system.

FIG. 10b schematically illustrates a further embodiment somewhat similar to that of FIG. 10a but wherein modified synchronizing or timing techniques are used. A free-running clock oscillator or pulse generator CL advances binary counter CN–9, which is provided with as many count conditions as is desired for adequate resolution along a single scan line in the CRT display. For example, counter CN–9 might be provided with eight binary stages so as to count through 256 counts and then re-cycle. The last-stage output of counter CN–9 is applied to advance counter CN–8, which is provided with enough stages to count up to the maximum number of scan lines desired in the display to be recorded. The output of all stages of counter CN–9 is applied to a DAC shown at 265, which converts the count in counter CN–9 to an analog voltage, which increases in staircase fashion as the count in counter CN–9 increases and then drops to zero as counter CN–9 re-cycles. A constant analog reference voltage is applied to DAC 265, the value depending upon the scale size of the display to be produced, and connection of different reference voltages to DAC 265 by selector switch S–10 allowing different sizes of recordings to be made. Alternately, the clock frequency may be changed to achieve similar results. The increasing staircase voltage is applied as the analog reference voltage input to DAC 262 and 264, each of which receives a respective digital signal from memory ROM of one of the same types of signals applied to DACs 251–254 in FIG. 10a. Each time counter CN–9 re-cycles, signifying the end of one sweep and the beginning of another sweep, the pulse applied to advance counter CN–8 advances the read address sent to the four sections of memory ROM. Thus it will be seen that DAC 261–264 will provide product output voltages similar to those provided by DACs 251–254 in FIG. 10a, and the DAC 261–264 output voltages are applied to CRT deflection systems in the same manner. The counter CN–9 output pulse when the counter re-cycles is also applied to the pulse transmitter to cause a pulse of ultrasonic energy to be applied to transducer T. The system shown contemplates that the reset of the most-significant stage of counter CN–9 will cause the transmitter to transmit. A conventional decoder connected to the stages of CN–9 may be used to cause pulse transmission at any desired count in CN–9 if it is desired to cause transmission some time before the sweep begins. In the system of FIG. 10b the output of counter CN–9 is also connected, via a "divide-down" conventional binary counter CN–7, and a driver amplifier 270, to provide pulses which advance stepping motor M–7, so that the speed and position of the transducer T along guide G are accurately related to the display produced on the CRT. An important feature of the systems of FIGS. 10a and 10b is that since no cams or potentiometers or the like need be driven, the motor utilized to drive the transducer along the guide may comprise a small motor mounted upon the guide or transducer carriage itself, so that no push-pull cable is required between the motor and the guide. Such an arrangement is particularly useful in human medical applications of the invention. Each of the components shown in FIGS. 10a and 10b is readily available commercially in various forms. Each of the DACs may comprise a well-known resistor network, such as a "ladder" network. The read only memory may take a variety of forms, and in one of its simplest forms will comprise a matrix of switches forming a card reader, so that the operator can change the contents of the memory by merely substituting one, or usually several, punched cards.

To one skilled in the art it can be seen that suitable input can be provided by cards, punched tape, magnetic tapes, etc., to a storage device capable of both recording and reading, thus providing outputs equivalent to ROM's used in 10A and 10B. Additionally, in place of the pull wire assembly, camera unit or cam drive unit and transducer/guide assembly may each be powered by synchronous motors with suitable reduction drives to assure relative synchronous motion.

In reference to FIG. 10B, if the frequency of clock CL is properly selected it may be used as a scaling factor for the display relative to inspected object, for example, scales may be varied from 1 to 1 according to the object/image size relationship. This method of scale adjustment provides a constant number of resolution elements along a scan line.

The invention accordingly comprises the features of construction, combination of elements, and arrangement of parts, which will be exemplified in the constructions hereinafter set forth, and the scope of the invention will be indicated in the claims.

The embodiments of the invention in which an exclusive property or privilege is claimed are defined as follows:

1. Ultrasonic inspection apparatus, comprising, in combination: ultrasonic transducer means for transmitting energy and receiving reflected energy; transducer guide means adapted for placement upon an object to be inspected for guiding said transducer means along a predetermined path; first drive means for driving said transducer means along said guide means; display means electrically connected to said transducer means for providing a display of successive line scans modulated by said reflected energy; camera means for supporting a film in a film plane to allow rotation of said film about an axis fixed relative to said display means; optical means including a lens situated between said display means and said film plane; second drive means for translating said optical means relative to both said display means and said film in a pair of coordinate directions and in a plane parallel to said film plane as transducer is driven along said predetermined path; third drive means for rotating said camera means about said axis as said transducer is driven along said predetermined path; and motive means for driving said drive means.

2. Apparatus according to claim 1 in which said second drive means comprises a first cam connected to be rotated by said motive means, a first cam follower engaging said first cam to translate said optical means in the first of said pair of coordinate directions, a second cam connected to be rotated by said motive means, and a second cam follower engaging said second cam to translate said optical means in the second of said pair of coordinate directions.

3. Apparatus according to claim 1 in which said third drive means comprises a cam connected to be rotated by said motive means, cam follower means engaging said cam, and a link connected between said cam follower means and said camera means to rotate said film about said axis.

4. Apparatus according to claim 1 having chain means looped around a plurality of sprocket means journalled in a base, said motive means being connected to rotate a first of said sprocket means, said first drive means comprising a flexible push-pull cable having a pair of elements slidable relative to each other, said elements being connected to said base and to a point on said chain means at one end of said cable, and to said guide means and said transducer means at the other end of said cable.

5. Apparatus according to claim 4 in which said second drive means includes at least one cam connected to be rotated by a second of said sprocket means.

6. Ultrasonic inspection apparatus, comprising, in combination: ultrasonic transducer means for transmitting energy and receiving reflected energy; transducer guide means adapted for placement upon an object to be inspected for guiding said transducer means along a predetermined path; first drive means for driving said transducer along said guide means; display means electrically connected to said transducer means for providing a display of successive line scans modulated by said reflected energy in a fixed location on said display means; camera means for supporting a film in a film plane; relaying means for transmitting said display of said line scans to a movable body to provide replicas of said line scans at said movable body; second drive means for translating said movable body relative to said camera means in a pair of coordinate directions in a plane parallel to said film plane as said transducer is driven along said predetermined path; third drive means for rotating said movable body relative to said camera means as said transducer is driven along said predetermined path; and motive means for driving said drive means.

7. Apparatus according to claim 6 in which said relaying means comprises a multiplicity of optical fibers each having one end fixed relative to said display means and its other end affixed to said movable body.

8. Apparatus according to claim 6 in which said relaying means comprises a multiplicity of photosensors positioned adjacent said display means and adapted to be illuminated by respective portions of said line scans at said display means to provide respective electrical signals, a multiplicity of light-emitting means affixed to said movable body, and means for connecting said electrical signals to respective ones of said light-emitting means.

9. Apparatus according to claim 6 in which said second drive means is pivotally connected to a first point on said movable body, said third drive means is connected to a second point on said movable body, and said third drive means comprises means for translating said second point of said movable body relative to said first point to rotate said movable body.

10. Ultrasonic inspection apparatus, comprising, in combination: ultrasonic transducer means for transmitting energy and receiving reflected energy; transducer guide means adapted for placement relative to an object to be inspected for guiding said transducer means along a path; first drive means for driving said transducer along said guide means; cathode ray tube display means electrically connected to said transducer means for providing a display of successive line scans modulated by said reflected energy on a surface of said display means, said display means including first and second beam positioning circuits for moving said display in first and second directions relative to said surface of said display means; camera means having a film plane fixed against translation relative to said display means; first means for applying first and second signals to said beam positioning circuits as said transducer is driven along said path, said first and second signals varying in accordance with predetermined functions of the curvature of said path; second means for rotating the display on said display means relative to said film plane in a plane parallel to said film plane; and motive means for driving said drive means and said first and second means.

11. Apparatus according to claim 10 in which said first means comprises first and second non-linear potentiometer means.

12. Apparatus according to claim 10 in which said camera means is held non-rotatable relative to said display means, said display means comprises means for generating a sweep waveform and first and second deflection circuits, and said second means comprises resolver means responsive to said sweep waveform and operative to apply signals to said deflection circuits.

13. Apparatus according to claim 10 in which said second means comprises means for rotating said camera means relative to said display means.

14. Apparatus according to claim 11 in which said first means includes a linear potentiometer having a resistance element and a movable contact, and non-linear motion-converting means, said motive means being connected through said non-linear motion-converting means to position said movable contact relative to said resistance element.

15. Apparatus according to claim 12 having non-linear motion-converting means, said motive means being connected through said non-linear motion-converting means to adjust said resolver means.

16. Ultrasonic inspection apparatus, comprising, in combination: directional transducer means for transmitting energy and receiving reflected energy; transducer guide means for guiding said directional transducer along a predetermined empirical path in a plane having X and Y coordinate directions, beginning at a reference point on said path, and for varying the direction $\theta$ of said transducer relative to a reference direction which said transducer has at said reference point; first drive means for driving said transducer along said guide means; display means electrically connected to said transducer for providing a display of successive line scans modulated by said reflected energy; recording means; positioning means for recording said successive line scans on successive portions of said recording means, said positioning means including first means for providing a translation of successive line scans relative to said recording means in a first direction in accordance with the function $dx/dL$, second means for providing a translation of successive line scans relative to said recording means in a second direction in accordance with the function of $dy/dL$, and third means for providing a rotation of successive line scans relative to said recording means in accordance with the function $d\theta/dL$; where L is the distance of said transducer along said path from said reference point, and motive means for driving said first drive means and said positioning means.

17. Ultrasonic inspection apparatus, comprising, in combination: transducer guide means adapted for placement upon an object to be inspected, said guide means including a plurality of rigid sections hinged together end-to-end; a plurality of ultrasonic transducer means mounted upon respective sections of said guide means and adapted to be movable along said sections of said guide means, said transducer means being operable to transmit energy and receive reflected energy; display means electrically connected to said transducer means for providing a display of successive line scans modulated by said reflected energy; recording means for recording said successive line scans; and means responsive to the angles between adjacent pairs of said rigid sections of said transducer guide for controlling the recording of said successive line scans on said recording means.

18. Ultrasonic inspection apparatus, comprising, in combination: ultrasonic transducer means for transmitting energy and receiving reflected energy; an array of light-emitting elements; a pulse counter means having a multiplicity of output lines which are successively energized as timing pulses are applied to said counter, said output lines being connected to respective ones of said light-emitting elements; means for applying a signal commensurate with said reflected energy to said light-emitting elements; and means for applying timing pulses to said counter means as said transducer means is moved relative to an object to be inspected, whereby said array produces a display.

19. Apparatus according to claim 18 having recording means and means for moving the display produced by said array relative to said recording means.

20. Ultrasonic inspection apparatus, comprising, in combination: ultrasonic transducer means for transmitting energy and receiving reflected energy; transducer guide means adapted for placement upon an object to be inspected for guiding said transducer means along a predetermined path; motive means for driving said transducer means along said guide means; and display means electrically connected to said transducer means for providing a display of successive line scans modulated by said reflected energy, said display means comprising means for providing a recurrent sweep waveform, a pulse counter, means operated by said motive means for applying pulses to said counter, memory means having a plurality of values of a plurality of functions stored at a plurality of addresses, said pulse counter being connected to said memory means to provide respective sets of digital signals representing a respective set of values of said functions for successive count conditions of said counter, a plurality of multiplying digital-to-analog converters, each of said converters being connected to receive the successive digital signals associated with a respective one of said functions, to receive said sweep waveform, and to provide a respective analog input signal, and cathode ray tube means having a beam intensity circuit controlled by said reflected energy and deflection means controlled by the analog output signals of said converters.

21. Apparatus according to claim 20 wherein said values of said plurality of functions comprise successive values of one component of said predetermined path, successive values of a second component of said predetermined path, and successive values of functions of the angle of said transducer means relative to a reference direction as said transducer means is moved along said predetermined path.

22. Ultrasonic inspection apparatus, comprising, in combination: ultrasonic transducer means for transmitting energy and receiving reflected energy; transducer guide means adapted for placement upon an object to be inspected for guiding said transducer means along a predetermined path; motive means for driving said transducer means along said guide means; and display means electrically connected to said transducer means for providing a display of successive line scans modulated by said reflected energy, said display means comprising a source of recurrent timing pulses, a first pulse counter connected to receive said timing pulses, a first digital-to-analog converter connected to receive the contents of said first counter and operative to provide a recurrent staircase waveform signal as timing pulses are applied to said first counter, a second pulse counter connected to said first pulse counter to be advanced each time said first pulse counter reaches a predetermined count condition, memory means having a plurality of values of a plurality of functions stored at a plurality of addresses, said second pulse counter being connected to said memory means to provide respective sets of digital signals representing a respective set of values of said functions for successive count conditions of said second counter, a plurality of multiplying digital-to-analog converters, each of said multiplying digital-to-analog converters being connected to receive the successive digital signals associated with a respective one of said functions, to receive said staircase waveform signal, and to provide a respective analog output signal, cathode ray tube means having a beam intensity circuit controlled by said reflected energy and deflection means controlled by the analog output signals of said multiplying digital-to-analog converters.

23. Apparatus according to claim 22 having means responsive to a predetermined count condition in said first counter for causing said transducer means to transmit energy.

24. Apparatus according to claim 22 having a third counter connected to said first counter to be advanced each time said first counter reaches a preselected count condition; and circuit means connected to said third counter and to said motive means for driving said motive means.

25. Apparatus according to claim 22 wherein said motive means comprises a motor mounted on said guide means.

* * * * *